(12) United States Patent
Schuler et al.

(10) Patent No.: US 11,304,034 B1
(45) Date of Patent: Apr. 12, 2022

(54) METHOD AND SYSTEM FOR COLLECTING EVIDENCE LEADS IN A COMMUNICATION SYSTEM

(71) Applicant: MOTOROLA SOLUTIONS, INC., Chicago, IL (US)

(72) Inventors: Francesca Schuler, Palatine, IL (US); James C Duran, Palatine, IL (US); Jonathan Solomon, Longmont, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/084,135

(22) Filed: Oct. 29, 2020

(51) Int. Cl.
| | | |
|---|---|---|
| *H04W 4/029* | (2018.01) | |
| *H04W 4/02* | (2018.01) | |
| *H04W 4/06* | (2009.01) | |
| *G06Q 30/02* | (2012.01) | |
| *G06Q 50/26* | (2012.01) | |
| *G01S 19/01* | (2010.01) | |
| *G06Q 30/00* | (2012.01) | |
| *G06F 16/29* | (2019.01) | |

(52) U.S. Cl.
CPC ............ *H04W 4/029* (2018.02); *G01S 19/01* (2013.01); *G06Q 30/018* (2013.01); *G06Q 30/0205* (2013.01); *G06Q 50/265* (2013.01); *H04W 4/027* (2013.01); *H04W 4/06* (2013.01); *G06F 16/29* (2019.01)

(58) Field of Classification Search
CPC ......... H04W 4/90; H04W 4/029; H04W 4/02; H04W 4/38; H04W 12/63; H04W 4/025; H04M 3/2281; H04M 2242/14; H04M 2242/30
See application file for complete search history.

(56) References Cited

U.S. PATENT DOCUMENTS

| | | |
|---|---|---|
| 5,815,417 A | 9/1998 | Orr et al. |
| 8,424,984 B2 | 4/2013 | Ritter |
| 9,386,050 B2 | 7/2016 | Oswald |
| 2015/0302425 A1* | 10/2015 | Borger ............... G06Q 10/0637 705/7.29 |
| 2016/0071113 A1 | 3/2016 | Papanicolaou et al. |
| 2019/0236346 A1* | 8/2019 | Barone .................. G06F 40/30 |

OTHER PUBLICATIONS

Schuler, Francesca et al.: Transmitting Near Real-Time Geographic Mass Messaging Requests, U.S. Appl. No. 16/942,473, filed Jul. 29, 2020, all pages.

* cited by examiner

*Primary Examiner* — Kwasi Karikari
(74) *Attorney, Agent, or Firm* — Barbara R. Doutre

(57) ABSTRACT

A communication system and method are provided for prioritizing the collection of evidence leads. Geographic mass messaging notifications are sent out alerting to an incident in conjunction with a request for incident information. Responding devices are prioritized based on device parameter information. The prioritization enables transient devices to be provided with a higher priority than non-transient devices. The assigned priority facilitates investigative follow-up of a plurality of evidence leads prior to the review of actual data content of each lead.

24 Claims, 4 Drawing Sheets

400

TABLE 1 PRIORITY POLICY FOR RESPONSES/EVIDENCE LEADS

| DEVICE PARAMETERS WITH RESPONSES | THRESHOLD PARAMETER RANGE | WEIGHTING POINTS |
|---|---|---|
| LOCATION (DISTANCE FROM INCIDENT AT TIME OF INCIDENT) | WITHIN 5 MILES FROM INCIDENT<br>5-20 MILES FROM INCIDENT<br>20-50 MILES FROM INCIDENT<br>GREATER THAN 50 MILES FROM INCIDENT | 20<br>15<br>10<br>5 |
| TRANSIENT (CHANGE IN LOCATION BETWEEN TIME NOTIFICATION AND TIME OF SUBMISSION) | GREATER THAN 50 MILES FROM INCIDENT<br>20-50 MILES FROM INCIDENT<br>5-20 MILES FROM INCIDENT<br>WITHIN 5 MILES FROM INCIDENT | 20<br>15<br>10<br>5 |
| TIME OF SUBMISSION (RELATIVE TO INCIDENT TIME) | WITHIN 6 HOURS<br>6-12 HOURS<br>12-24 HOURS<br>>24 HOURS | 20<br>15<br>10<br>5 |
| IDENTIFICATION OF SUBMITTER | IDENTIFICATION KNOWN<br>ANONYMOUS | 20<br>0 |
| TYPE OF RESPONSE CONTENT | ATTACHMENT WITH TEXT<br>TEXT ONLY<br>VOICE ONLY | 20<br>5<br>5 |

TABLE 2

| PRIORITY | AVAILABLE POINTS |
|---|---|
| 1 | 60-100 |
| 2 | 50-60 |
| 3 | 40-50 |
| 4 | 20-40 |

FIG. 4

METHOD AND SYSTEM FOR COLLECTING EVIDENCE LEADS IN A COMMUNICATION SYSTEM

BACKGROUND OF THE INVENTION

Details of events provided by witnesses are a critical element of evidence collection gathered during an investigation of an incident. Gathering incident scene information from witnesses has always been an investigative challenge. High quality evidence leads and witness incident knowledge may start to decline after just a few days, or even a few hours, of an incident occurring. Potential witnesses may be difficult to track down for an incident occurring near a large transient population, such as witnesses to a running marathon bombing incident or witnesses to a high speed vehicular chase incident. An initial influx of evidence leads may further exacerbate the challenge of determining which witnesses to follow up with first. Accordingly, there is a need for an improved approach to the collection of evidence leads from witnesses.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 provides an example for prioritization of evidence leads in accordance with some embodiments.

Figure 1:
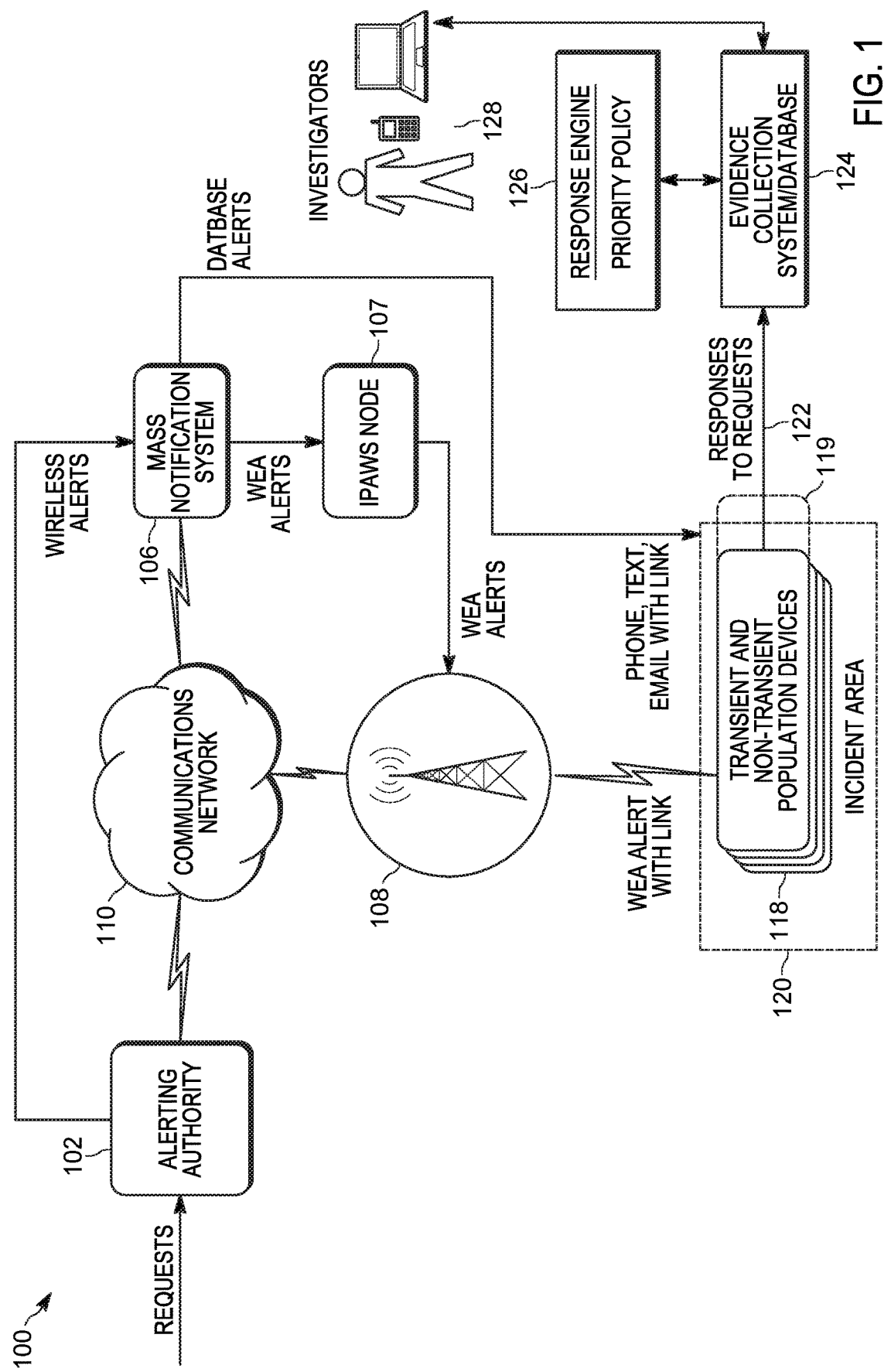
FIG. 1 illustrates a wireless messaging and response system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a communication system and method for prioritizing the collection of evidence leads. Geographic mass messaging notifications in conjunction with a request for incident information are sent out to a plurality of communication devices alerting to an incident. The embodiments provide for the prioritization of incident feedback responses originating from responding devices. Prioritization is based on parameters associated with the responding devices. The prioritization enables transient devices located within an incident area population to be provided with a higher priority than non-transient devices. The assigned priority facilitates investigative follow-up of a plurality of evidence leads prior to any detailed review of the actual content of each lead by identifying those responders likely to leave a specified geographic area.

For ease of description, some or the entire example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of a communication system 100 formed and operating in accordance with some embodiments. Communication system 100 comprises an alerting authority 102, a mass notification system 106, an Integrated Public Alert and Warning System (IPAWS) Node 107, a cellular network 108, a population of communication devices 118 (both non-transient and transient) located within an incident area 120, an evidence collection system 124, a response engine 126, and investigative communication units 128, all communicatively coupled to one another, directly or indirectly, via a communications network 110.

In accordance with the various embodiments, the mass notification system 106 transmits a mass messaging incident notification in conjunction with an incident feedback request to a plurality of communication devices, such as the population of communication devices 118, operating within a specified geographic area associated with an incident, such as incident area 120. The evidence collection system 124 receives and stores incident feedback responses submitted by responding devices of the plurality of communication devices. The response engine 126 assigns priority to the responding devices based on device parameters associated with the responding devices, the device parameters comprising at least location of the responding devices and mobility of the responding devices. Highly transient responding devices and/or those devices predicted to be transient are identified (for example device 119 which is leaving the incident area 120) and prioritized. The prioritization enables highly transient devices to be provided with a higher priority than non-transient or less transient devices. The assigned priority facilitates investigative follow-up prior to reviewing the actual data content of each lead provided by responding devices.

The communications network 110 is a communications network including wireless connections, wired connections, or combinations of both. The communications network 110 may be implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof. The cellular network 108 may operate according to an industry standard cellular protocol, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented.

The communication system 100 may include fewer or additional components or combinations thereof. For example, the evidence collection system 124 may be managed by a third party system independent of the response engine 126. The response engine 126 of the embodiments may be a standalone component of the system 100 or may be integrated as part of a service. In accordance with the embodiments, priority policies are set, managed and adjusted within the response engine 126 independently of the collected evidence, thereby advantageously enabling customization of priorities for different types of incidents.

In FIG. 1, the alerting authority 102 represents the hardware and telecommunications infrastructure of an alerting authority. The alerting authority 102 is an entity authorized to send wireless alerts using the mass notification system 106. The alerting authority 102 receives requests to send such alerts from various subordinate entities. Examples of such entities that submit alert requests may include, but are not limited to, a public safety answering point, a Real Time Crime Center (RTCC), and a public works department. The requests may be, for example, seeking witnesses to a crime that occurred recently, information about a missing person, or information about broken down utility lines within the incident area 120. Sending an alert with request for information to all electronic devices such as for example, cell phones, land-line telephones, two-way radios, tablets, and computers asking users of those devices to respond with relevant information can help authorities to more quickly resolve the incident. Additionally, in accordance with the embodiments, the ability identify transient and non-transient members of the population of responders within incident area 120 facilitates prioritization, allowing authorities to quickly contact and receive feedback from potentially transient witnesses, prior to non-transient witnesses, who might otherwise leave the incident area.

Geographic mass messaging notifications in conjunction with incident feedback requests are sent as wireless alerts to the mass notification system 106. It is not necessary for the alerting authorities 102 to have a database of recipients. The mass notification system 106 includes hardware and software configured to determine whether the wireless alert is a Wireless Emergency Alert (WEA) or a Database Alert. When the wireless alert is a WEA alert, the WEA alert is forwarded from the mass notification system 106 to the IPAWS Node 107 for coordination through the communication network 110 to cellular network 108 for transmission as a WEA alert with feedback request link to the incident area 120. When the wireless alert is a Database Alert, the Database Alert is sent from the mass notification system 106 to the communication network 110 for coordination through appropriate networks, such as internet, and/or telephone networks, for transmission as a database alert with feedback request link to the incident area 120. The WEA alerts with feedback request links are provided to cell phone devices within incident area 120. For the purposes of this application, cell phone devices, being mobile devices, will be considered transient devices. Database Alerts with feedback request links, however, will go out to both transient and non-transient devices within the incident area 120, where such devices may include but are not limited to cell phones, land line phones, emails, voip, and/or chat messages to name a few. Hence, both WEA alerts with feedback request link and database alerts with feedback request link are transmitted to a population of device users within incident area 120, where the population may comprise a combination of transient and/or non-transient device users.

The communication devices 118 receive the wireless notifications with incident feedback request link and present them, for example, on a display screen of each device. (for example, "A crime has been reported in your area. The suspect was seen fleeing West from 123 Main Street at approximately 6:15 PM wearing a blue shirt and tan pants. If you have any information about the suspect or the crime, please text the information to 12345.") Some or all of the population of device users may respond to the incoming alerts (using the provided link). Notifications accompanied by an incident feedback request link (for both WEA alerts and Database Alerts) advantageously facilitate the collection of evidence leads and other relevant information pertaining to an incident from a larger pool of communication devices which may include both non-transient communication devices and transient communication devices.

Responses to requests 122, generated by both transient and non-transient members of the population are collected by evidence collection system 124 and stored within an evidence collection database contained therein. Response engine 126 monitors the evidence collection database 124 and coordinates prioritization of the evidence based on device parameters of the responding devices. The evidence collection system 124 with internal database provides categorization and attribute alignment of the responding devices based on the priority set by the priority policy of response engine 126. In accordance with the embodiments, the response engine 126 applies a priority policy for the retrieval of evidence based on the device parameter information, without having to analyze the specific content of the collected evidence. The response engine 126 advantageously assigns priority based at least on the responding device parameters of location of the responding device and mobility of the responding device. Investigative units 128 are then able to retrieve stored evidence in a prioritized manner from the evidence collection system 124 via a management interface provided therebetween. Hence, investigative units 128, such as those under the control of law enforcement, are able to interface with the evidence collection system 124 to retrieve tips from the database that have been appropriately prioritized by the priority policy of the response engine 126. The response engine's 126 priority policy application is also advantageously accessible to investigative devices 128. Allowing the priority policy to be accessible to investigative devices 128, enables investigators to adjust the prioritization parameters, attributes, and thresholds for different incidents. For example, priority thresholds for a responding device's location and mobility can be adjusted based on the incident type being a crime scene or a utility event.

As stated previously, the priority policy of response engine 126 is established based on device parameters associated with the responding device(s), those device parameters comprising at least location and mobility (current and predicted) of the responding device. For example, location of the responding device may be based on GPS coordinates at the time of the incident. Predicted mobility of the responding device may be based on the device's IP address, delta from the location of the IP address to the incident itself, and/or the radius of the mass notification are just a few example that can be used to predict a potentially transient device. Device information such as a device URL utilized for the device's database contacts vs. a different URL used for transient contacts provides can provide yet another device parameter to distinguish the priority between responses. Browser based location can also be gathered as a device parameter. These various parameters can all be set by the priority policy application programmed into the response engine 126. Those policies may be set and adjusted by the investigators accessing the response engine 126 through their investigative devices 128 and/or may be pre-programmed into response engine 126.

Additional device parameters may further refine the priority by the response engine 126, such as time of submission of the response relative to the incident notification time, identification of the submitter (anonymous or known), and type of response content (video, photo, text, voice). The priority determination advantageously enables transient devices to be quickly identified by the response engine 126 so that responses stored in the evidence collection database 124 from those devices can be quickly accessed by investigators prior to a potential transient witness leaving the incident area. The response engine 126 may further provide settings to adjust the prioritization logic. Priority may be assigned based on threshold ranges associated with the device parameters. For example, location of the responding device can be compared to predetermined location thresholds distance ranges associated with the incident. The response engine 126 can adjust such distance ranges may based on the type of incident. Mobility of the responding devices can be compared to mobility thresholds relative to the incident location. Hence, location and predicted mobility can both be used to elevate the priority of responding devices.

The communication system of FIG. 1 enables investigators to determine which leads originate from transient and non-transient members of the population Within the transient population, those individuals may only be at an incident area for a short period of time. The ability to contact the transient witness to obtain a witness statement can now be advantageously prioritized.

Figure 2:
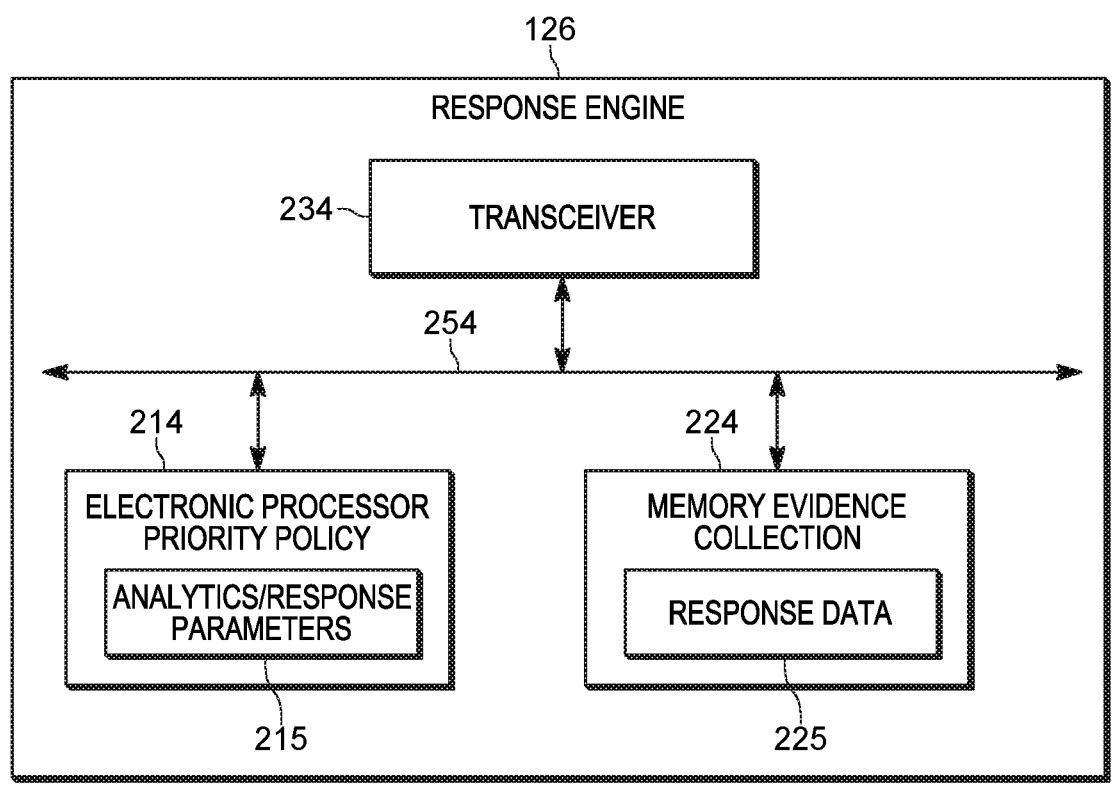
FIG. 2 schematically illustrates a response engine in accordance with some embodiments.

FIG. 2 schematically illustrates the response engine 126 of FIG. 1 in accordance with some embodiments. In this example embodiment, the response engine 126 comprises an electronic processor 214, a memory 224, and a transceiver 234 communicating over one or more control and/or data buses (for example, a communication bus 254). As mentioned previously, the response engine 126 may be stand-alone component, such as a computer server, or may be integrated as part of a service. Data pertaining to the incident feedback responses are received by response engine 126 from the evidence collection system 124 of FIG. 1 via transceiver 224. The priority policies of response engine 126 are set, managed and adjusted independently of the evidence collection system 124 of FIG. 1. The electronic processor 214 comprises an analytics engine 215 which analyzes the incident feedback responses to determine device parameters associated with the responding devices. The electronic processor 214 applies a priority policy to the incident feedback responses and performs analytics to generate response data using the analytics engine 215. The electronic processor 214 assigns priority based at least on the responding device parameters of: location of the responding device and mobility of the responding device. Priority may further be refined based on the additional parameters of time of the response submission relative to the incident notification time; identification of the submitter of the responding device; and type of response (text only, photo image, and/or video). Memory 224 provides a repository for the response parameter data associated with each responding device. Due to the potentially large number and variety of the responses, the response engine 126 analyzes device parameters associated with the responding devices (as opposed to the detailed data content of each response), thereby providing a level of prioritization associated with the device prior to analysis of the detailed data within a response. Storage of the response data may be temporary or permanent dependent on the memory type and policy being applied. The retention of response data associated with the devices can be adjusted based on the type of incident and the priority policy associated therewith. The response data is used to sets and manage the priority of the data stored within the database of the evidence collection system 124 of FIG. 1. The investigative devices 128 can, in response to user input, retrieve the priority information associated with the incident feedback responses from the evidence collection database 124 via the management interface provided therebetween.

Figure 3:
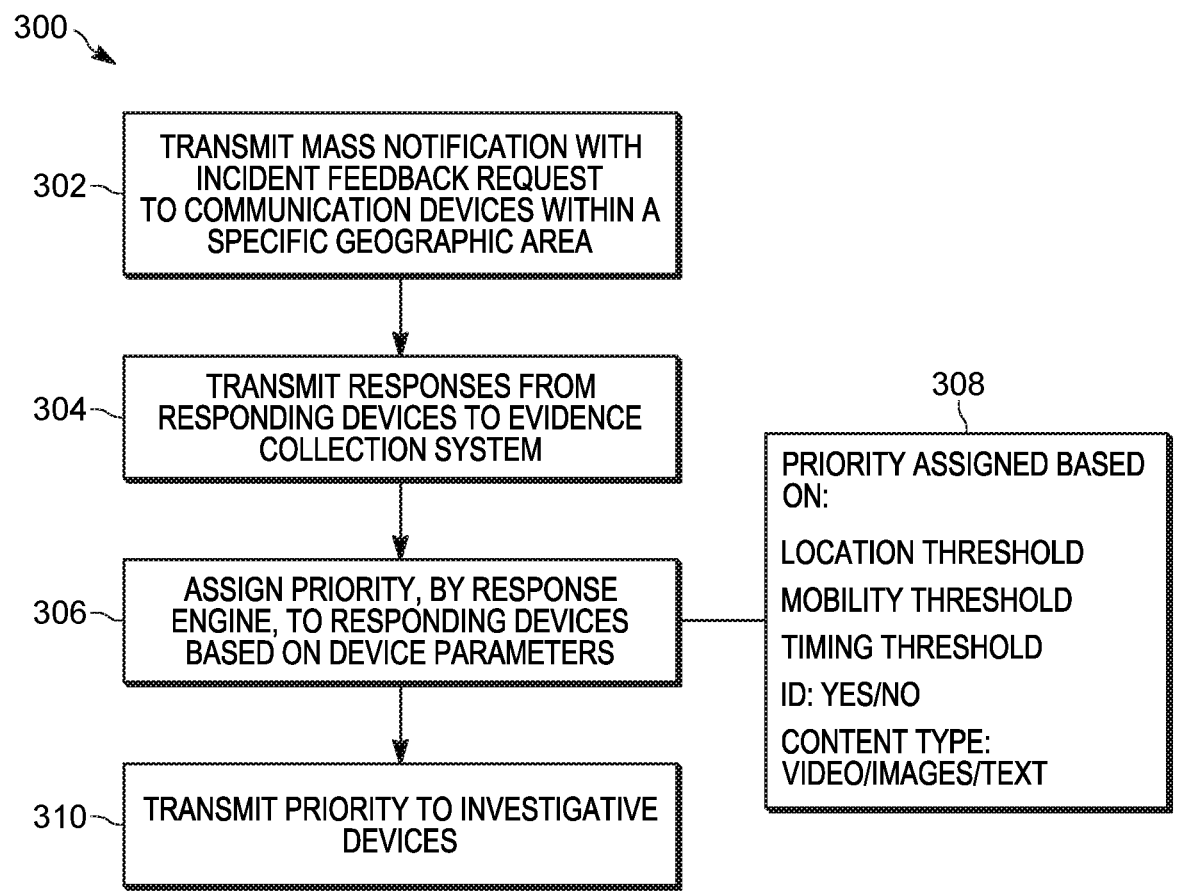
FIG. 3 is a flowchart illustrating a method for collecting evidence leads in accordance with some embodiments.

FIG. 3 is a method 300 of collecting evidence leads in a communication system in accordance with some embodiments. Method 300 begins at 302 by transmitting a mass messaging notification of an incident in conjunction with an incident feedback request from a mass notification system to a plurality of communication devices operating within a specified geographic area associated with the incident. The incident may be an imminent or a non-imminent incident. The incident feedback request may include text for display at the communication devices receiving the wireless notification as previously described. The specific geographic area may be an incident location (for example, the location or a reported crime, the last known location of a missing person, or utility incident). Notifications with incident feedback request are sent to all devices operating in the specified geographic area surrounding the incident.

Those devices of the plurality of communication devices that respond to the incident feedback request are referred to as responding devices. Responding devices transmit their incident feedback responses to an evidence collection system at 304. Priority of the responding devices is assigned at 306, by a response engine. The priority is based on analytics performed on the incident feedback responses to determine device parameters associated with the responding devices. Device parameters upon which priority may be based are listed at 308.

In accordance with some embodiments, the priority that is assigned at 306 is based at least on the device parameters of location and mobility of the responding device shown at 308. Additional device parameters (also shown at 308) may be used to further refine priority assignment to the responding devices, such as time of response of the responding device, identification status of the responding device, and response type (text only, text and video, text and photos). of the responding device. The priority assigned at 306 may be a numerical value based on points, logic and/or combinations thereof associated with device parameter threshold ranges.

The assigned priority may be either transmitted over the network to investigative devices at 310 (from evidence collection system 124) or alternatively retrieved by investigative devices having access to the database of evidence collection system 124. The method and system advantageously allow for responses from potentially highly transient witnesses to be retrieved quickly so that follow-up investigations can take place prior to the witness leaving the geographic area.

FIG. 4 shows an example table illustrating a priority policy for responses in accordance with some embodiments. Both WEA alerts with feedback request link and database alerts with feedback request link may be transmitted to a population of device users within incident area, where the population may comprise a combination of transient and/or non-transient device users. The priority policy of Table 1 bases priority on a plurality of device parameters 402 associated with devices providing responses to a request for incident information. A plurality of threshold parameter ranges 404 are provided for each parameter and weighting points 406 are assigned thereto. While the weighting points 406 are shown as numerical values, other weighting factors can be used. FIG. 4 further shows Table 2 as an example of priority level based on cumulative points from Table 1. The plurality of threshold parameter ranges 404 and weighting points 406 enables the assignment of priority for responding devices. The priority policy can be applied to incident feedback responses to both WEA alerts and database alerts. Alternatively, adjustments can be made to the priority policy to prioritize the WEA incident feedback responses over other feedback responses.

In accordance with some embodiments, the device parameters upon which priority is based include location of the responding devices and mobility of the responding devices. The location and mobility of the responding devices may be based on change in location between time of notification and time of submission (where a different location outside of the notification area is considered transient). For example, current location of a responding device at the time of the incident may be based on GPS coordinates at the time of the incident, while predicted mobility may be based on changes in the GPS coordinates from the time of the incident and time of response submission. As a further example, responding devices with a non-local IP address may be assigned a higher priority than responding devices with a local IP address based, the non-local IP address being considered a more transient device. A responding device associated with a non-local service provider may be assigned a higher priority than a responding device associated with a local service provider, the non-local service provider being considered a more transient device.

Additionally, is some embodiments, the thresholds may be adjusted based on incident type. For example, distance threshold ranges and timing ranges pertaining to a high threat incident, such as a bombing incident, may have different threshold ranges than those associated with a traffic accident. The adjustment of the thresholds may be initially determined by the alerting authority based on incident type, then subsequently adjusted by the response engine and/or investigative units based on initial responses by responding incident type and initial responses.

As further seen in Table 1, the device parameters upon which priority may further be based may include time of the response relative to incident notification time, identification of the responding device (known or anonymous), and type of response content (text-only; text and photo; text, photo, and video) For example, a higher priority may be assigned to a responding device based on known user identification, attachment of images, and text in the response feedback, while a lower priority may be assigned to a responding device without user identification and a text-only response. Priority is assigned prior to any detailed analysis of the actual data content (i.e. without analysis of the text content, photo content, and/or video content) thereby providing investigators with a very fast initial prioritization of potential witnesses to the incident.

FIG. 4 further shows Table 2 with an example of priority level assigned based on cumulative points of Table 1. As an example, a high priority level 1 would be assigned to a communication device having a cumulative point value ranging between 60-100 points. A low priority level 4 would be assigned for cumulative point ranges of 20-40 points. As mentioned previously, priority assignment may also be dynamic based on the mobility of the responding device. For example, a subscriber device having an initial level 2 priority may dynamically be adjusted to a higher level 1 priority based on movement of the device from a nearby location to a further out location, indicating that the device is currently moving. The change in priority can be communicated to investigative devices, such as investigative devices 128 of FIG. 1, so that informed decisions pertaining to witness follow-up can be made.

Accordingly, there has been provided a system and method for prioritizing communication devices responding to a mass notification combined with an incident feedback request. The system and method beneficially enable solicitation of evidence information from a wider group of target devices and prioritization of that evidence based on device parameters tied to the mobility of the source. The prioritization can be adjusted based on changes in transient movement of a communication device or anticipated transient movement of a communication device. The approach provided by the system and method addresses the challenges associated with transient responses. Multiple responses to a request for incident information can now be managed through the effective prioritization provided by the embodiments. For incidents where there is a large transient population (for example a marathon bombing), investigators are now able to quickly determine which leads originate from local subscriber devices and which leads originate from more transient, mobile users within and outside of the geographic area of the incident. Investigators can use the assigned priority to quickly follow up with highly transient individuals who may only be at an incident area for a short period of time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example, first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication system, comprising:
   a mass notification system for transmitting a mass messaging incident notification in conjunction with an incident feedback request to a plurality of communication devices operating within a specified geographic area associated with an incident;
   an evidence collection system for receiving and storing incident feedback responses submitted by responding devices of the plurality of communication devices;
   a response engine, communicatively coupled to the evidence collection system, the response engine assigning priority to the responding devices based on device parameters associated with the responding devices, the device parameters comprising:
   location of the responding devices; and
   mobility of the responding devices.

2. The communication system of claim 1, wherein mobility of the responding devices further includes:
   predicted mobility of the responding devices.

3. The communication system of claim 2, wherein location of the responding devices is based on GPS coordinates at time of incident notification; and
   the predicted mobility being based on at least one of:
     changes in the GPS coordinates from time of the incident notification and time of response submission, the change in GPS coordinates being outside of the geographic area of the incident;
     a non-local IP address of the responding device; and
     a non-local service provider associated with the responding device.

4. The communication system of claim 3, wherein a responding device having a non-local IP address is assigned a higher priority than a responding device with a local IP address.

5. The communication system of claim 3, wherein a responding device associated with a non-local service provider is assigned a higher priority than a responding device associated with a local service provider.

6. The communication system of claim 1, wherein priority is assigned based on device parameter threshold ranges managed by the response engine.

7. The communication system of claim 6, wherein the device parameter threshold ranges for assigning priority are adjustable based on incident type.

8. The communication system of claim 1, wherein the device parameters upon which priority is based further comprises:
   time of the response submission relative to time of incident notification;
   user identification of a responding device; and
   type of response content.

9. The communication device of claim 8, wherein the type of response content comprises one or more of:
   text, photo, and video; and
   wherein priority is assigned without analysis of associated text content data content, photo content, and video content.

10. The communication system of claim 8, wherein higher priority is assigned to responding devices having a known user identification, attachment of images and text in the incident feedback response, and a lower priority is assigned to responding devices without user identification and text-only responses.

11. The communication system of claim 1, wherein the response engine further comprises:
an electronic processor and analytics engine which apply a priority policy to the incident feedback responses to generate response data, the response data being used to set and manage the priority of the incident feedback responses stored within the evidence collection system.

12. The communication system of claim 1, wherein priority of the responding devices is communicated to investigative devices operating in the communication system.

13. A method of collecting evidence leads in a communication system, comprising:
transmitting a mass messaging notification from a mass notification system of the communication system, in conjunction with an incident feedback request to a plurality of communication devices operating within a specified geographic area associated with an incident;
receiving and storing incident feedback responses submitted by responding devices of the plurality of communication devices to an evidence collection system;
receiving responses, at a response engine of the communication system, from responding devices of the plurality of communication devices; and
assigning priority, by a response engine communicatively coupled to the evidence collection system, to the responding devices based on device parameters associated with the responding devices, the device parameters comprising:
location of the responding devices; and
mobility of the responding devices.

14. The method of claim 13, wherein mobility of the responding devices further includes:
predicted mobility of the responding devices.

15. The method of claim 14, wherein location of the responding devices is based on GPS coordinates at time of incident notification; and
the predicted mobility being based on at least one of:
changes in the GPS coordinates from time of the incident notification and time of response submission, the change in GPS coordinates being outside of the geographic area of the incident;
non-local IP addresses of the responding devices; and
non-local service providers associated with the responding devices.

16. The method of claim 15, wherein responding devices with non-local IP addresses are assigned a higher priority than responding devices with local IP addresses.

17. The method of claim 15, wherein responding devices associated with non-local service providers are assigned a higher priority than responding devices associated with local service providers.

18. The method of claim 13, wherein priority is assigned based on device parameter threshold ranges managed by the response engine.

19. The method of claim 18, further comprising:
adjusting the device parameter threshold ranges based on based on incident type.

20. The method of claim 13, wherein the device parameters upon which priority is based further comprises:
time of responses relative to time of incident notification;
identification of the responding devices; and
type of response content of the responding devices.

21. The method of claim 20, wherein type of response content comprises one or more of:
text, photo, and video; and
priority is assigned without analysis of associated text content data content, photo content, and video content.

22. The method of claim 21, wherein higher priority is assigned based on a known identification of the responding device and attachment of images in the response feedback of the responding device, and a lower priority is assigned to responding devices without user identification and text only responses in the response feedback.

23. The method of claim 13, wherein assigning priority further comprising:
applying a priority policy at the response engine to the incident feedback responses to generate response data, the response data being used to set and manage the priority of the incident feedback responses stored within the evidence collection system.

24. The method of claim 13, further comprising:
communicating priority of the responding devices to investigative devices operating in the communication system.

* * * * *